United States Patent [19]
Ayres

[11] Patent Number: 5,947,578
[45] Date of Patent: Sep. 7, 1999

[54] BACK LIGHTING DEVICE

[75] Inventor: John A. Ayres, Lapeer, Mich.

[73] Assignee: Nu-Tech & Engineering, Inc., Lapeer, Mich.

[21] Appl. No.: 08/547,648

[22] Filed: Oct. 24, 1995

[51] Int. Cl.[6] ................................................. F21V 13/04
[52] U.S. Cl. ........................... 362/31; 362/255; 362/267; 362/327; 362/330
[58] Field of Search .................................... 362/26, 27, 31, 362/255, 260, 330, 226, 267, 268, 327

[56] References Cited

U.S. PATENT DOCUMENTS

| | | | |
|---|---|---|---|
| 2,839,670 | 6/1958 | Gladstone | 362/31 |
| 2,948,073 | 8/1960 | Roper | 362/31 |
| 3,543,014 | 11/1970 | Bustad | 362/31 |
| 3,610,911 | 10/1971 | Curl | 362/31 |
| 4,151,582 | 4/1979 | Grunberger | 362/31 |
| 4,229,783 | 10/1980 | Eberhardt . | |
| 5,057,974 | 10/1991 | Mizobe | 362/31 |
| 5,207,493 | 5/1993 | Murase et al. . | |
| 5,262,928 | 11/1993 | Kashima et al. . | |
| 5,283,673 | 2/1994 | Murase et al. . | |
| 5,289,351 | 2/1994 | Kashima et al. . | |
| 5,339,179 | 8/1994 | Rudisill et al. . | |
| 5,375,043 | 12/1994 | Tokunaga | 362/31 |
| 5,390,436 | 2/1995 | Ashall . | |
| 5,392,199 | 2/1995 | Kashima et al. . | |
| 5,408,388 | 4/1995 | Kobayashi et al. . | |
| 5,410,454 | 4/1995 | Murase et al. . | |
| 5,613,751 | 3/1997 | Parker et al. | 362/31 |

FOREIGN PATENT DOCUMENTS

| | | | |
|---|---|---|---|
| 5-45651 | 2/1993 | Japan | 362/260 |

*Primary Examiner*—Alan Cariaso
*Attorney, Agent, or Firm*—Fildes & Outland, P.C.

[57] ABSTRACT

A back lighting device includes a light waveguide having generally planar upper and lower surfaces, a light module having a lamp member encapsulated between the upper and lower surfaces, a specular reflective material applied about the waveguide lower surface, and a light extracting material applied about the waveguide upper surface. The waveguide can be mounted in a user specific frame to allow high volume usage of a common waveguide element.

23 Claims, 4 Drawing Sheets

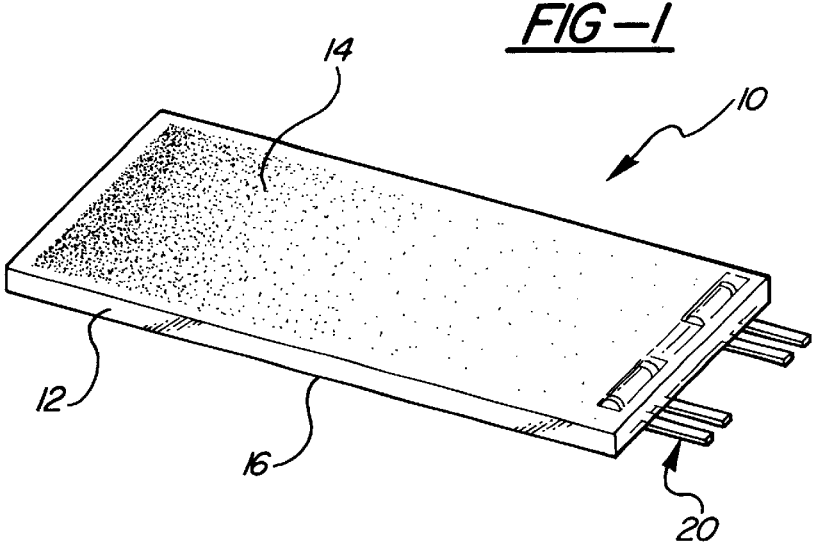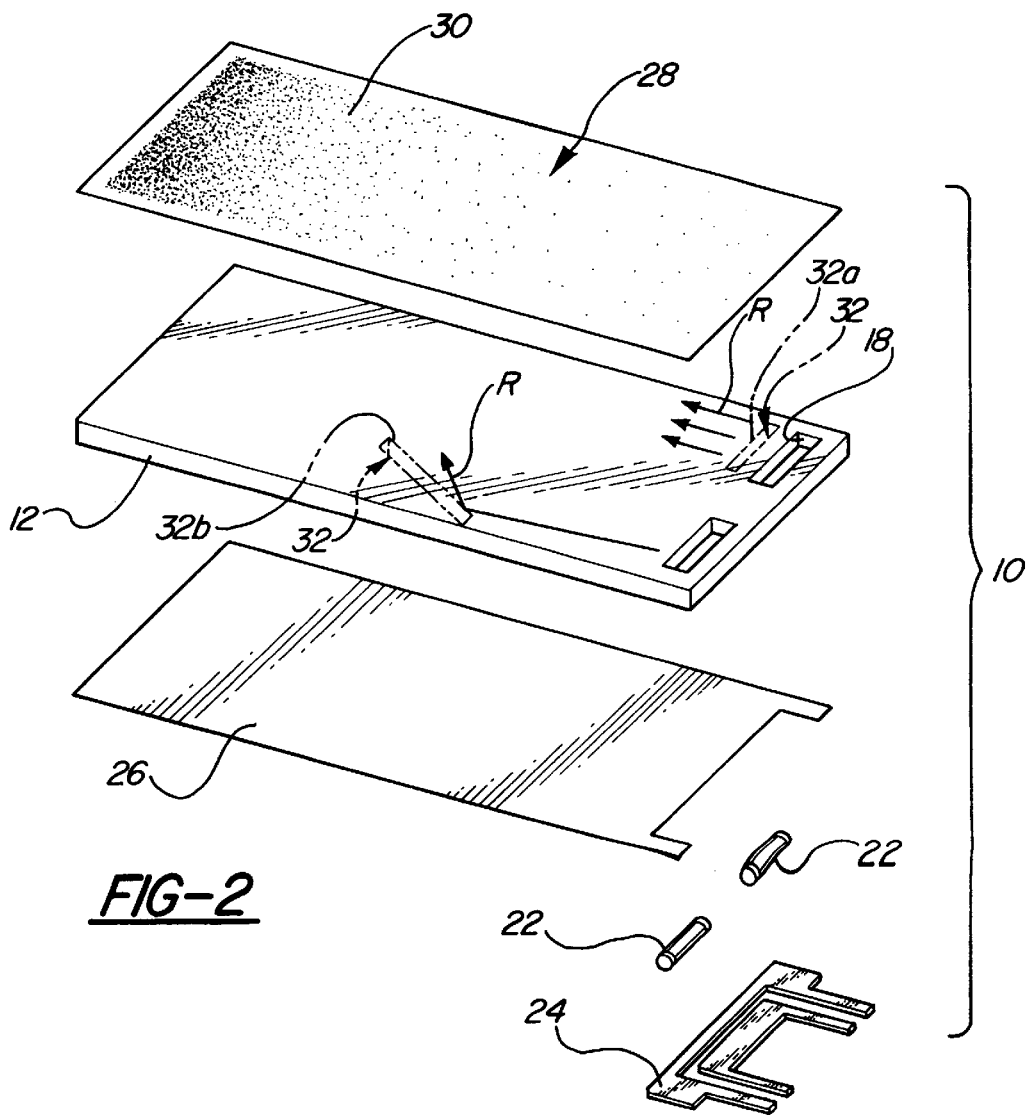

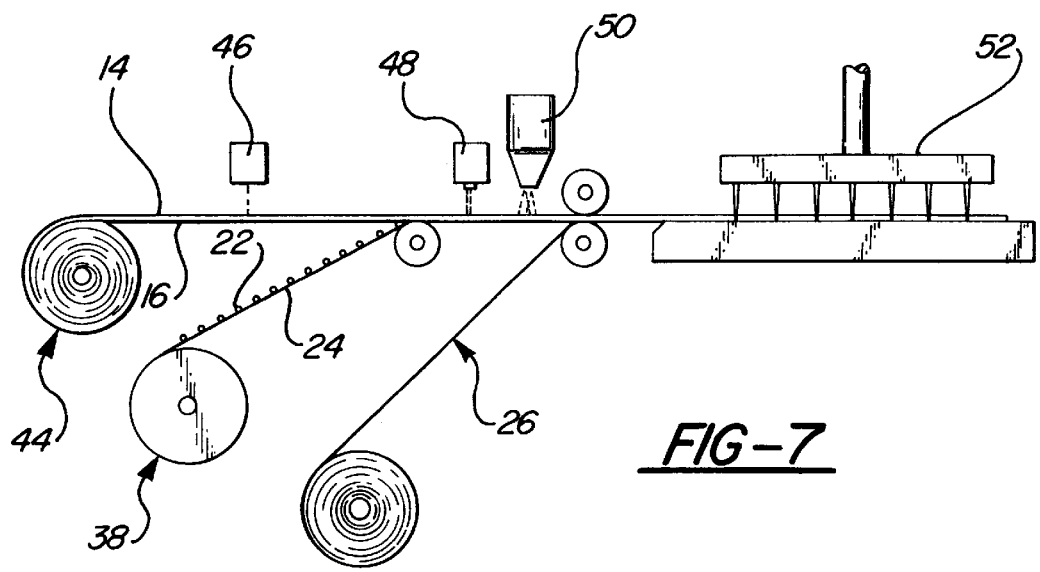
FIG-7
FIG-8
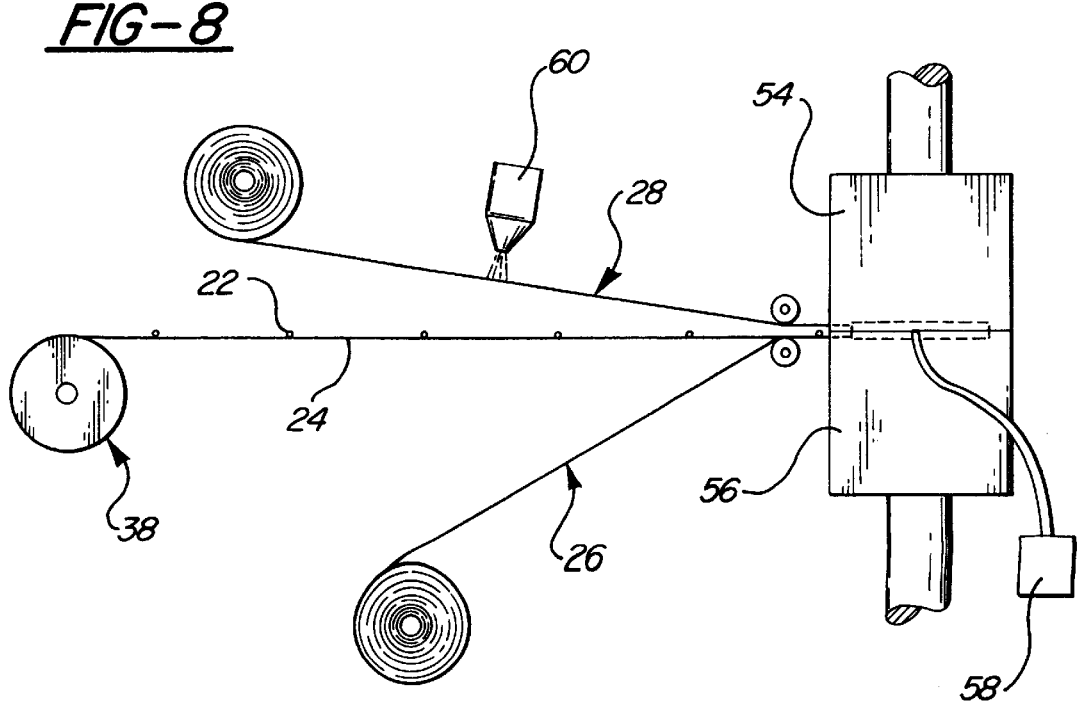

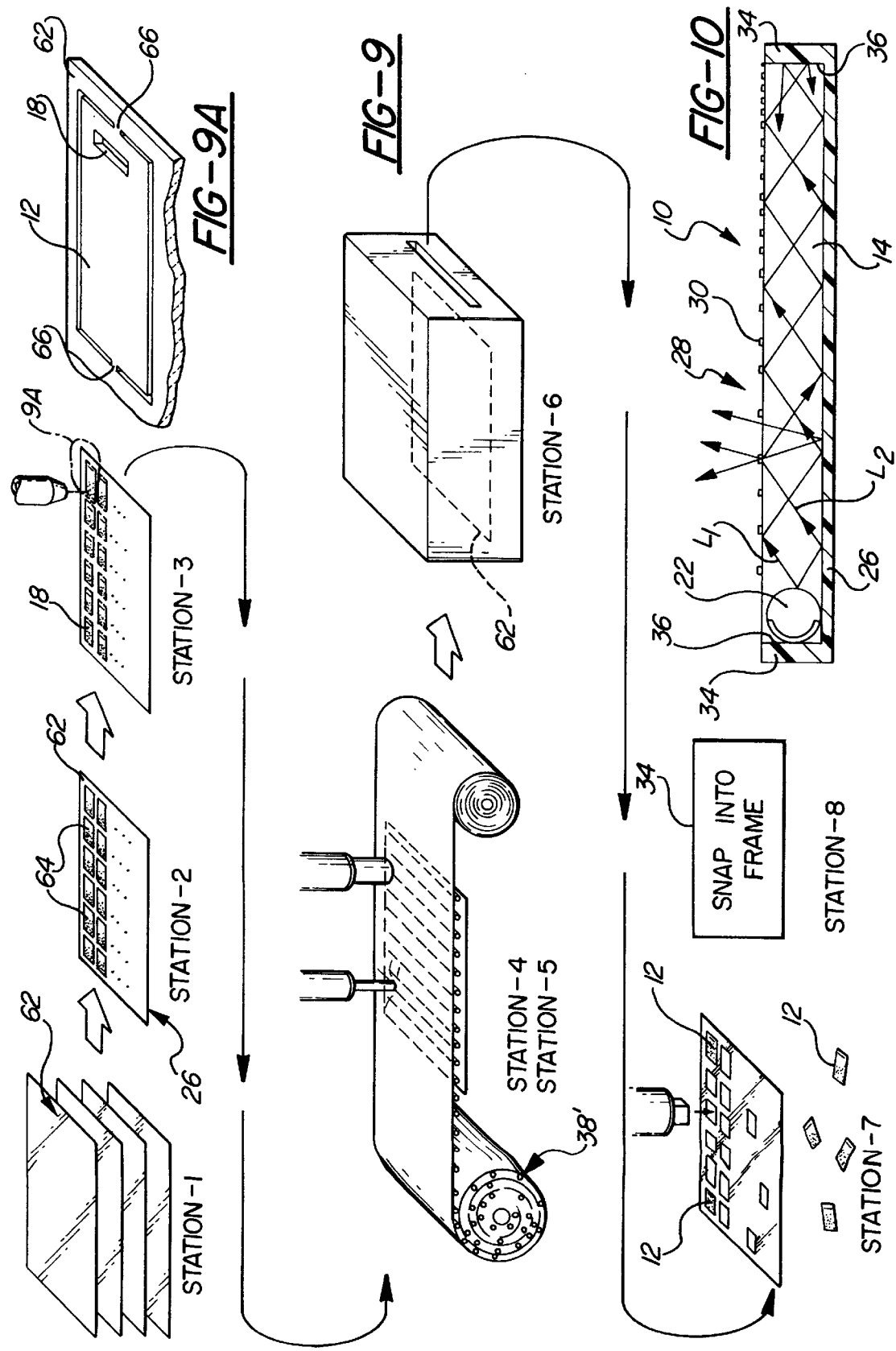

BACK LIGHTING DEVICE

FIELD OF THE INVENTION

This invention relates to a back lighting device for back lighting a liquid crystal display and more particularly to a back lighting device having more efficient light utilization and light output.

BACKGROUND OF THE INVENTION

Liquid crystal displays are used extensively in cellular telephones, pagers, watches, etc. Such displays are illuminated by light panels referred to as back lighting devices. Conventional devices generally utilize a light source mounted adjacent a plastic light waveguide for containing light from the light source entering the waveguide. Light is extracted from the waveguide by providing a surface that changes the reflective or transmissive characteristics of the waveguide causing light striking the surface to be transmitted out of the waveguide.

These conventional devices suffer from light loss associated with inefficient light coupling with the light source being placed next to the plastic waveguide. In addition, these devices usually have the light extraction surface mounted away from the light exiting surface so that a portion of the light striking the surface is reflected back into the waveguide.

In addition to these and other disadvantages associated with conventional back lighting devices, a differently sized back lighting device must be manufactured for a differently sized application.

SUMMARY OF THE INVENTION

The present invention provides a back lighting device for liquid crystal displays having improved light coupling between a light source and a light waveguide.

The present invention also provides a back lighting device having improved light output for a given light input. In providing the improved light output, the device outputs a combination of light extracted via a light extracting surface of the waveguide as well as light reflected from an opposed reflective surface of the waveguide.

The waveguide can be assembled into a frame to provide reflection of light from the waveguide edges back into the waveguide. It can be interchangeably used with different shaped frames for various applications.

More specifically, a back lighting device according to the present invention includes a light module having a lamp member disposed between generally planar upper and lower surfaces of a light waveguide, made of a plastic material. The light waveguide may be a preformed piece in which the lamp member is disposed and encapsulated or the light waveguide may be molded about the lamp member. A specular reflective material is applied onto the waveguide lower surface and a light extracting material is applied onto the waveguide upper surface.

In one embodiment of the invention, the waveguide is preformed and includes a receiving aperture between the upper and lower surfaces. The lamp member is encapsulated, using an optical grade adhesive, between the upper and lower surfaces in the receiving aperture. In another embodiment of the invention, the light module including the lamp member is placed in a plastic injection molding die and the light waveguide is molded around the light module. Such potting and molding construction increases the light coupling between the lamp member and light waveguide and thereby the light transmitted from the lamp member into the waveguide.

The lamp member may comprise any microminiature lamp including LEDs and an electrical lead frame mounting the lamp. A surface mounted incandescent lamp with an integral reflector for reflecting light generated by the lamp into the waveguide is preferred.

The light extracting material applied onto the waveguide upper surface includes a light scattering element which causes the light in the light sheet to be diffused out of the upper surface of the waveguide and diffused towards the reflector on the lower surface. Preferably the light scattering element is applied so as to form a light extracting gradient of increasing density in a direction progressing away from the light module. It is generally formed of a dot pattern with open spaces between the dots. The light scattering element can be paint or ink that is either painted or printed onto the upper surface of the light waveguide. Alternatively the light scattering element is a film, having a light extracting gradient therein, attachable to the upper surface of the waveguide.

The specular reflective material applied onto the waveguide lower surface can be painted or printed onto the lower surface of the light waveguide. In similar fashion to the light extracting material, the specular reflective material may be included in a film that is applied to the lower surface of the light waveguide. The reflective material reflects light from the light scattering element back through the top surface of the waveguide through the open spaces between the dots of the light scattering element approximately doubling the light output of the back lighting device vis-a-vis conventional back lighting devices.

In order to increase the interchangeability of the light waveguide, various sized frames can be used for framing the light waveguide. In this way, the same light waveguide can be used in different applications, i.e. cellular telephones, pagers, etc. Preferably the frame includes inside edges exhibiting diffuse reflective properties to enhance light reflectivity back into the light waveguide.

A method of making such a back lighting device includes the steps of:

forming a light waveguide having generally planar upper and lower surfaces from a plastic material;

disposing a lamp member between the upper and lower surfaces;

encapsulating the lamp by potting or injection molding;

applying a specular reflective material onto the waveguide lower surface; and applying a light extracting material onto the waveguide upper surface.

These and other features and advantages of the invention will be more fully understood from the following detailed description of the invention taken together with the accompanying drawings.

BRIEF DESCRIPTION OF THE DRAWINGS

In the drawings:

FIG. 1 is a perspective view of a back lighting device constructed in accordance with one embodiment of the invention;

FIG. 2 is an exploded perspective view of the back lighting device of FIG. 1;

FIG. 7 is a schematic view of a process for constructing back lighting devices embodying the present invention;

FIG. 8 is a schematic view of another process for constructing back lighting devices embodying the present invention;

FIG. 9 is a schematic view of yet another process for constructing back lighting devices;

FIG. 9A is an enlarged schematic view of a waveguide generally laser cut out of a plastic sheet in accordance with the process illustrated in FIG. 9; and FIG. 10 is a schematic illustration of the back lighting device constructed in accordance with the present invention illustrating its functional characteristics.

DETAILED DESCRIPTION OF THE INVENTION

Figure 3:
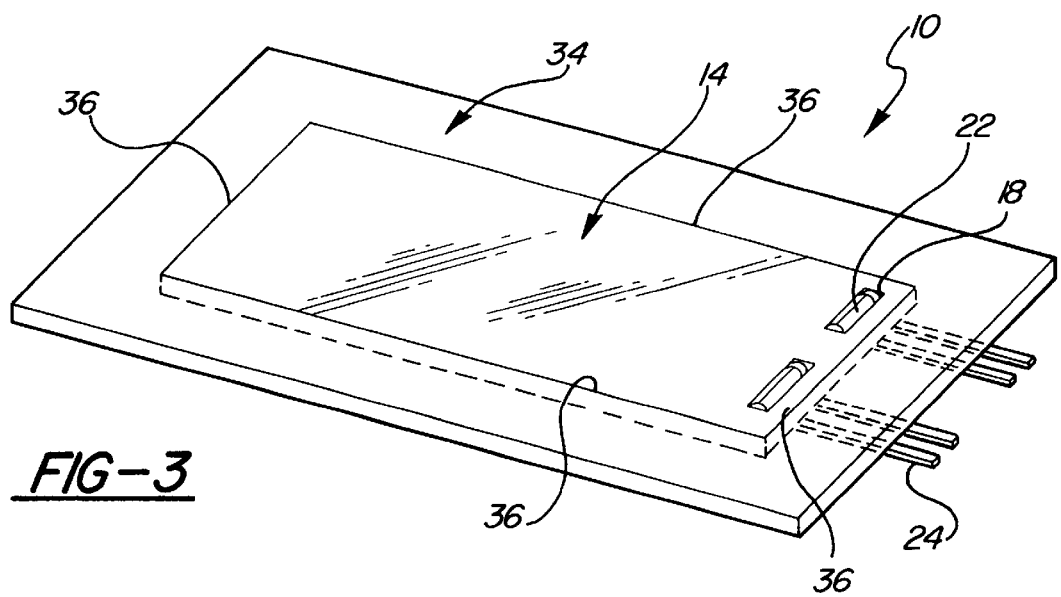
FIG. 3 is a perspective view of a back lighting device constructed in accordance with another embodiment of the invention illustrating a frame having diffuse reflective surfaces for mounting a waveguide therein.

Referring now to the drawings in detail, numeral 10 generally indicates a device for back lighting of liquid crystal displays (LCDs) for pagers, cellular telephones, etc. Referring to FIGS. 1 and 2, there is shown a back lighting device 10 including a light waveguide 12, of a plastics material such as acrylic, polystyrene or polycarbonate, having generally planar upper and lower surfaces 14,16.

In the embodiment illustrated, there are provided two apertures 18 for mounting a light module 20 and receiving a lamp member 22 between the upper and lower surfaces 14,16 of the waveguide 12. The light module 20 includes one or more microminiature lamp members 22 illustrated as a surface mount incandescent lamp mounted on an electrical lead frame 24 electrically connected to the lamp member. The lamp member 22 is encapsulated between the upper and lower surfaces 14,16 of the light waveguide 12 using an optical grade adhesive, potting the lamp member into the waveguide. Such mounting improves light coupling vis-a-vis the conventional waveguides utilizing edge lighting.

A specular reflective material 26 is applied onto the waveguide lower surface 16 for reflectively transmitting light impinging the reflective material upwardly toward the upper surface 14 of the waveguide 12 and out of the waveguide. The specular reflective material 26 illustrated in FIG. 2 is a reflective tape applied onto the waveguide lower surface 16. Alternatively, the specular reflective material 26 may be a known reflective element painted, printed or deposited onto the lower surface 16 of the waveguide 12.

A light extracting material 28 is applied onto the waveguide upper surface 14 which diffuses the light projected upwardly through the light waveguide 12. The light extracting material 28 includes a light scattering element 30 preferably arranged or applied so as to form a light extracting gradient of increasing density in a direction progressing away from the lamp member 22 and having dots or features spaced apart, thereby providing uniform illumination of the light waveguide across the upper surface 14 of the waveguide.

The light scattering element 30 may be paint, painted onto the upper surface 14 of the waveguide 12 or ink, printed, by means of screen, pad or ink jet printing, onto the upper surface. Alternatively, as illustrated in FIG. 2, the light scattering element 30 is included in a film that defines the light extracting material 28.

As illustrated in phantom in FIG. 2, the light waveguide 12 may include light shaping optics 32 extending between the upper and lower surfaces 14,16 of the waveguide 12 for controllably propagating light rays R from the lamp member 22. As illustrated, the light shaping optics 32 are slots cut into the waveguide 12. Alternatively, other types of known light-shaping optics can be utilized. The light shaping optics 32 illustrated are both curved 32a and straight 32b line cuts made, for example by laser, through the light sheet to provide focusing or dispersion lenses or ray R deflectors to affect the light distribution in the waveguide. These linear or curved shaping optics 32 act like a mirror or lens to redistribute light as desired within the waveguide 12.

Figure 4:
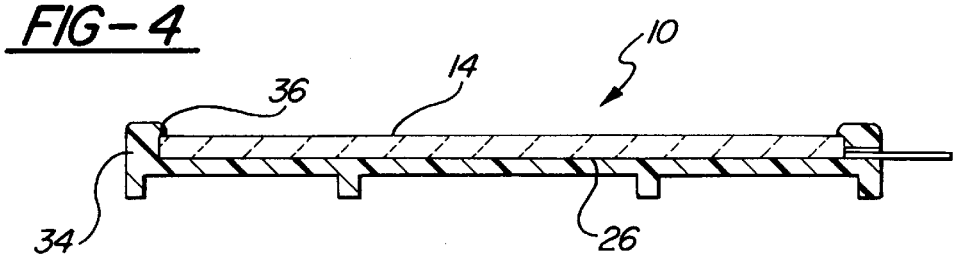
FIG. 4 is a sectional view of the back lighting device of FIG. 3.

As illustrated in FIGS. 3 and 4, the back lighting device 10 includes a frame member 34 having inside edges 36 for mounting the waveguide 12. The frame inside edges 36 are preferably coated with a diffusively reflective material or alternatively the frame inner edges are inherently diffusively reflective. Such a frame 34 can be adapted for mounting a standard size waveguide 12 into a variety of applications. The frame 34 illustrated can also provide the specular reflective material 26 for the waveguide lower surface 16. While the configuration of inside edges 36 of the frame 34 remain constant, the outside edge configuration of the frame can be adapted or sized for mounting the waveguide 12 in any of a variety of devices. The inside edges 36 of the frame 34 reflect any light transmitted through the waveguide 12 back into the waveguide where it is reflected within the waveguide and either is extracted at the upper surface 14 or reflected by the lower surface 16.

Figure 5:
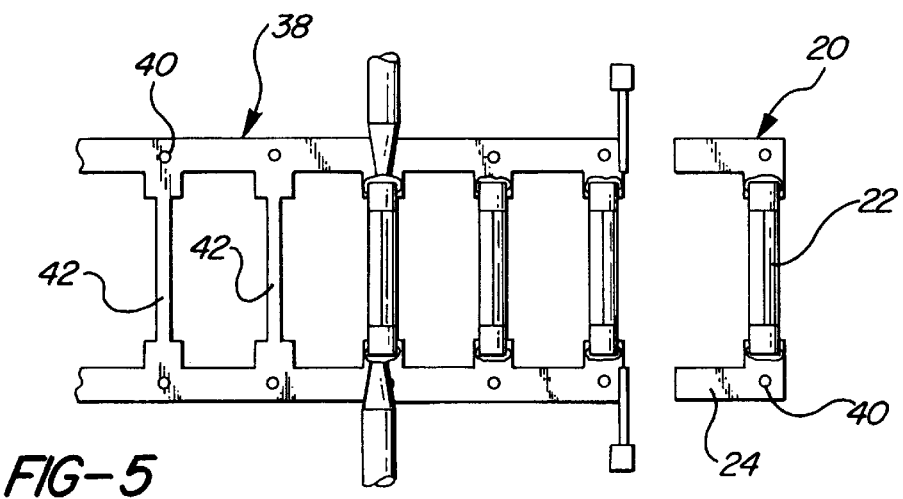
FIG. 5 is a schematic view of a process of assembling light modules including a lamp member and lead frame in accordance with the present invention.
Figure 6:
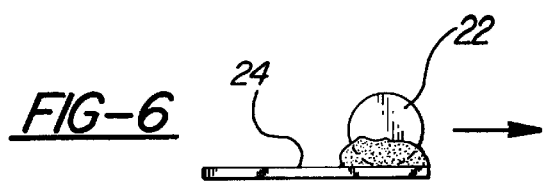
FIG. 6 is a schematic view illustrating the mounting of the lamp member by joining it to the lead frame by soldering, welding, or gluing with a conductive adhesive.

Turning to FIGS. 5–9, there are shown three general methods for making the back lighting device 10 in accordance with the present invention. FIG. 7 illustrates the method of making the back lighting device 10 specifically illustrated in FIGS. 1 and 2. FIGS. 5 and 6 illustrate a method of attaching lamp members 22 to a coil or tape 38 of electrical lead frames 24. The coil 38 includes a plurality of locating apertures 40 for advancing and locating the lead frames 24. Coil 38 also includes a connector portion 42 for holding the two halves of the lead frames 24 together during assembly. Connector portions 42, which comprise a thin strip of conductive material, can be "blown" out like a fuse before the lamp members 22 are soldered in place. Alternatively, connector portions 42 can be trimmed out by laser or other mechanical means.

In the method of assembly shown, the lamp members 22, illustrated as surface mount incandescent lamps having a reflector therein, are soldered at their ends onto a coil 38 of beryllium copper or phosphor bronze or other plated conductor which includes a plurality of frames 24. This assembly of light modules 20 is systematically fed, in each of the herein below described processes, into a machine to readily assemble or mold back lighting devices 10.

Referring now to FIG. 7, a coil 44 of plastics material to be laser cut into a plurality of light waveguides 12 is uncoiled in an assembly operation. Lamp receiving apertures 18, corresponding to the number of lamp members 22 to be disposed in the waveguide 12, are laser cut into the strip of plastic at 46 as it is uncoiled. The coil 38 of light modules 20, including lead frame members 24 with lamps 22 attached, is uncoiled as successive lamp members are disposed into the apertures 18. An optical grade adhesive is applied at 48 into the apertures 18 around the lamp members 22 to pot the lamp members 22 into the apertures. An ultra-violet curable, heat sensitive, or two-part optical adhesive can be used to pot the lamp members 22 into the apertures 18.

In the assembly process illustrated, the reflective material 26 comprises a reflective tape including an adhesive on one side. The reflective material 26 likewise is uncoiled in the assembly operation and adhered to the lower surface 16 of the plastic coil to become the light waveguide 12. In the embodiment shown, the light extracting material 28 is printed onto the upper surface 14 of the light waveguide 12 at 50. This printing and drying is accomplished through known techniques such as screen, pad, and ink jet printing. Alternatively, though not shown, a film roll of printed diffusive material can be adhered to the upper surface 14 of the light waveguide 12 to provide the light scattering element. The strip of waveguides 12 is then cut by a laser cutter 52 to form individual waveguides.

FIG. 8 illustrates yet another alternative method of making the back lighting device 10. In the embodiment illustrated in FIG. 8, the light waveguide 12 is injection molded between upper and lower dies 54,56. Therein, the light modules 20 including the lamp members 22 and lead frames 24 are sequentially positioned between the upper and lower plastic injection molding dies 54,56. A plastics material 58 is injection molded into the closed cavity of the dies 54,56 to encapsulate the lamp member 22 in the light waveguide 12.

As illustrated in FIG. 8, the specular reflective material 26 and light extracting material 28 comprise films fed into the upper and lower dies 54,56, prior to the injection of the plastic material 58. Light extracting material 28 can be pre-manufactured, or the extraction pattern can be printed on a tape substrate at 60. Alternatively, the specular reflective material 26 and light extracting material 28 can be as otherwise herein described and applied after the molding process.

FIG. 9 illustrates an alternative sheet process for manufacturing a plurality of back lighting devices 10 out of sheets 62 of a plastics material having one side coated with a specular reflective material. As illustrated by stations $1 \geq 8$, the sheets 62 provided in station 1 have a corresponding plurality of light extracting surfaces 64 applied to the surface of the plastic sheet opposite the reflective surface at station 2. Lamp member receiving apertures as well as the general light waveguide shape corresponding to the plurality of back lighting devices to be manufactured is laser cut into the plastic sheet, station 3, illustrated in FIG. 9A. As illustrated, two or more tabs 66 are left after laser cutting to connect the cutout waveguides 12 connected to the plastic sheets 62 for further assembly.

At station 4, a coil 38' of lamp members 22 connected to electrical lead frames 24 is fed into the lamp receiving apertures 18 and the individual light modules 20 are trimmed. An optical grade adhesive is applied, station 5, in the lamp receiving aperture 18 around the lamp member 22 and the adhesive is UV or oven cured, station 6, to encapsulate the lamp members 22 in the formed waveguides 12. In station 7, the formed light waveguides are punched out of the plastic sheet 62 breaking the tabs 66. The punched out light waveguides 12 can then be snapped into a frame having diffusively reflective inner edges as illustrated in station 8.

In the back lighting device of FIG. 10, the characteristics of the light waveguide 10 are illustrated. A light ray designated $L_1$ is a ray that travels all the way from the lamp member 22 or from any one of the extractor features to the end of the waveguide 12 opposite the lamp. Here light ray $L_1$ exits the waveguide 12, hits the diffusive frame member 34, scatters, and reenters the waveguide.

Light ray $L_2$ is a ray that reflects from the specularly reflective material 26 on the bottom surface, hits light extracting element 30 on the upper, exiting surface, and scatters. Some light exits the waveguide 12 and some bounces back to the reflective bottom surface where it is reflected out of waveguide between the light extracting elements. This process of scattering and reflection doubles the light output from the waveguide 12 when compared to putting the extraction feature on the lower surface of the waveguide between the bottom surface and the reflector.

Although the invention has been described by reference to a specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A back lighting device comprising:
    a light waveguide having generally planar upper and lower surfaces and including a lamp receiving aperture through the waveguide and connecting said planar surfaces;
    a light module having a lamp member, said lamp member disposed within said aperture between said upper and lower surfaces and within and closely coupled to said waveguide;
    a specular reflective material applied onto said waveguide lower surface; and
    a light extracting material applied onto said waveguide upper surface;
    said back lighting device being devoid of any light transition area between the light waveguide and the lamp member for transmitting light between said lamp member and said light waveguide.

2. The back lighting device of claim 1 wherein said waveguide is of a plastics material.

3. The back lighting device of claim 2 wherein said plastics material comprises one of acrylic, polystyrene, and polycarbonate.

4. The back lighting device of claim 1 wherein said lamp member is encapsulated in said aperture between said upper and lower surfaces by an optical grade potting adhesive in said lamp receiving aperture.

5. The back lighting device of claim 1 wherein said light module includes an electrical lead frame electrically connected to and mounting said lamp member.

6. The back lighting device of claim 5 wherein said electrical lead frame comprises one of phosphor bronze, beryllium copper, and a plated conductor.

7. The back lighting device of claim 6 wherein said lamp member includes an incandescent surface mount lamp.

8. The back lighting device of claim 7 wherein said surface mount incandescent lamp includes a reflector portion for reflecting light generated thereby into said waveguide.

9. The back lighting device of claim 1 wherein said light extracting material includes a light scattering element.

10. The back lighting device of claim 9 wherein said light scattering element includes spaced apart light diffusing elements applied so as to form a light extracting gradient of increasing density in a direction progressing away from said lamp member.

11. The back lighting device of claim 10 wherein said light scattering element is paint.

12. The back lighting device of claim 10 wherein said light scattering element is ink.

13. The back lighting device of claim 10 wherein said light scattering element is defined by a film having a light extracting gradient.

14. The back lighting device of claim 1 comprising:

light shaping optics comprising one of concentrating lenses, dispersing lenses and ray deflectors extending between said upper and lower surfaces of said waveguide for redistributing within the waveguide light from said lamp member.

15. The back lighting device of claim 14 wherein said light shaping optics are slots cut into said waveguide through said upper and lower surfaces.

16. The back lighting device of claim 1 comprising a frame having inside edges for mounting said waveguide.

17. The back lighting device of claim 16 wherein said frame inner edges are diffusively reflective.

18. The back lighting device of claim 17 wherein said frame includes said specular reflective material.

19. A back lighting device comprising:

a light waveguide having generally planar upper and lower surfaces;

a light module having a lamp member, said lamp member disposed within said light waveguide between said upper and lower surfaces and within and closely coupled to said waveguide, said light module including an electrical lead frame electrically connected to and mounting said lamp member;

a specular reflective material applied onto said waveguide lower surface; and a light extracting material applied onto said waveguide upper surface;

said back lighting device being devoid of any light transition area between the light waveguide and the lamp member for transmitting light between said lamp member and said light waveguide.

20. The back lighting device of claim 19 wherein said electrical lead frame comprises one of phosphor bronze, beryllium copper, and a plated conductor.

21. The back lighting device of claim 20 wherein said lamp member includes an incandescent surface mount lamp.

22. The back lighting device of claim 21 wherein said surface mount incandescent lamp includes a reflector portion for reflecting light generated thereby into said waveguide.

23. The back lighting device of claim 19 comprising:

an optical grade adhesive potting said lamp member into said waveguide.

* * * * *